United States Patent
Waag et al.

(10) Patent No.: US 9,833,775 B2
(45) Date of Patent: Dec. 5, 2017

(54) METHOD OF MANUFACTURING OPEN-CELL BODIES AND BODIES MANUFACTURED USING SAID METHOD

(71) Applicant: Glatt GmbH, Binzen (DE)

(72) Inventors: Ulf Waag, Bad Saeckingen (DE); Norman Reger, Bad Klosterlausnitz (DE); Peter Reinhardt, Beiersdorf (DE)

(73) Assignee: GLATT GMBH, Binzen (DE)

( * ) Notice: Subject to any disclaimer, the term of this patent is extended or adjusted under 35 U.S.C. 154(b) by 0 days.

(21) Appl. No.: 14/668,023

(22) Filed: Mar. 25, 2015

(65) Prior Publication Data

US 2015/0273442 A1    Oct. 1, 2015

(30) Foreign Application Priority Data

Mar. 26, 2014   (DE) ...................... 10 2014 205 6233

(51) Int. Cl.

| | |
|---|---|
| *B01J 35/04* | (2006.01) |
| *B01J 37/02* | (2006.01) |
| *B01J 37/08* | (2006.01) |
| *B01J 23/86* | (2006.01) |
| *B01J 21/04* | (2006.01) |
| *B01J 21/06* | (2006.01) |

(Continued)

(52) U.S. Cl.

CPC .............. *B01J 23/862* (2013.01); *B01J 21/04* (2013.01); *B01J 21/06* (2013.01); *B01J 35/04* (2013.01); *B01J 37/0217* (2013.01); *B01J 37/082* (2013.01); *B22F 3/1137* (2013.01); *B22F 3/1146* (2013.01); *B22F 5/003* (2013.01); *B22F 2005/005* (2013.01); *B22F 2998/10* (2013.01)

(58) Field of Classification Search
None
See application file for complete search history.

(56) References Cited

U.S. PATENT DOCUMENTS 4,056,586 A  * 11/1977 Pryor ................. B01D 39/2093
                                                          264/43
4,076,888 A    2/1978 Perugini et al.
(Continued)

FOREIGN PATENT DOCUMENTS

| DE | 19621638 A1 | 12/1997 |
|---|---|---|
| DE | 102008054596 | 6/2010 |
| EP | 0087789 | 9/1983 |

*Primary Examiner* — Colin W. Slifka
(74) *Attorney, Agent, or Firm* — Jacobson Holman, PLLC.

(57) ABSTRACT

In a method of manufacturing open-cell bodies, individual parts of an open pore plastic in a size which corresponds to the size of the bodies to be manufactured while taking account of the shrinkage on a sintering or an open pore plastic element having predetermined break points which take account of the size and geometrical design of bodies to be manufactured are/is in filtrated and coated with a suspension in which at least one powdery material is contained. Organic components are expelled after a first heat treatment. Subsequently, a sintering is carried out. Parts of porous plastic provided with the suspension are separated before the first heat treatment or wherein, afterwards the open-cell element which is obtained from the plastic element from the material with which the bodies are formed is cut by forces and thereby separated bodies can be obtained.

6 Claims, 1 Drawing Sheet

(51) Int. Cl.
*B22F 3/11* (2006.01)
*B22F 5/00* (2006.01)

(56) References Cited

U.S. PATENT DOCUMENTS

| | | |
|---|---|---|
| 5,409,375 A | 4/1995 | Butcher |
| 5,614,307 A | 3/1997 | Anderson et al. |
| 6,547,967 B1 | 4/2003 | Adler et al. |
| 6,635,339 B1 | 10/2003 | Adler et al. |

* cited by examiner

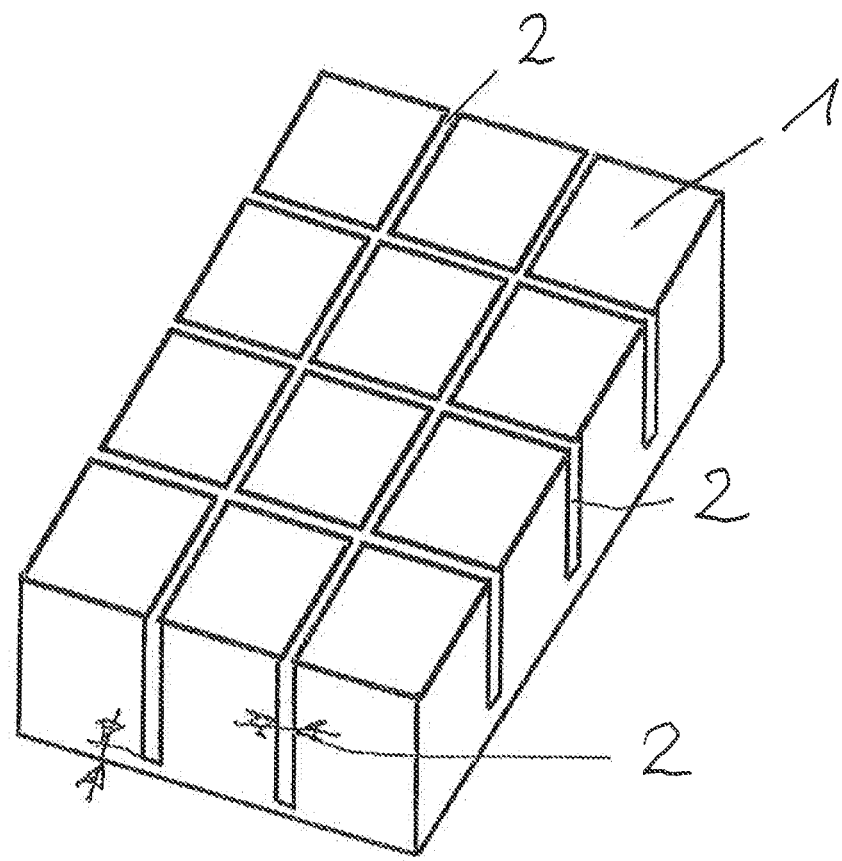

METHOD OF MANUFACTURING OPEN-CELL BODIES AND BODIES MANUFACTURED USING SAID METHOD

The invention relates to a method of manufacturing open-cell bodies and to bodies manufactured using said method. The bodies can in this respect be manufactured from metal or ceramic materials. The open cells are tetrakaidecahedron-shaped cells whose walls are formed with webs. The surfaces are open and form the pores. There is therefore a difference between cell size and pore size.

A technology for the manufacture of metal and ceramic open-cell structures or bodies in accordance with the so-called Schwartzwalder process is prior art. In this respect, an open-cell polyurethane foam element is preferably coated with a metal powder binder or a ceramic powder binder suspension and is subsequently debound and sintered using a heat treatment. The organic components are expelled in particular by pyrolysis, in the debinding.

This technology is established for an economic manufacture of planar open-cell structures.

In contrast, open structures or bodies of small dimensions in the mm range, which are suitable for pouring, are particularly advantageous in the area of heterogeneous catalysis or synthesis. They have previously been cut out of planar plates mechanically or by irradiation with a jet of energy.

A substantial effort arises in this respect, especially with bodies of small dimensions. For the manufacture of open-cell bodies divided into small sections having a dimension of 1 cm×1 cm×1 cm, for example, 10,000 parts having a total area of 1 m$^2$ are obtained from plate-like open-cell semi-finished products by a cutting process. They can be obtained from corresponding sintered plates e.g. by sawing, wire eroding, abrasive water jet cutting and also by electron beam cutting or laser beam cutting. These cutting processes produce a material loss and result in striking changes at the cutting edges which can also disadvantageously impair the porosity in these surface regions. The specific surface can likewise be reduced there, which is unfavorable on a use as a catalyst or as a separator. With mechanical cutting processes, deformations of the webs of an open-cell body arise at the cutting edges in mechanical cutting processes, which deformations disadvantageously influence the properties and the surface geometry. As a result of the use of thermal cutting processes in the separation, the already sintered material and the surface likewise change by the thermal input.

With an assumed cutting width of 0.5 mm or 1 mm, which occurs with such a known cutting, a material volume loss of 10% or 20% respectively results from this. With a targeted sponge dimension of 0.8 cm×0.8 cm×0.8 cm of the plate-like metal sponge element, a material loss of 12% or 25% respectively results. In addition to the direct material loss, there is additionally also a process time loss which arises in the coating and heat treatment/sintering. In addition, correspondingly more energy is required for the heat treatment/sintering.

The cutting to size of the 10,000 bodies having the dimensions 1 cm×1 cm×1 cm corresponds to a total cut length of 200 m. With assumed cutting costs of around € 1 per meter, corresponding cutting costs of € 200 per m$^2$ arise at a semi-finished product to be cut.

These additional costs make the economic manufacture of open-cell bodies of small dimensions more difficult.

In addition, it is not possible to manufacture specific geometries of open-cell bodies or it is only possible with a great effort and/or cost with the known possibilities. This in particular relates to such bodies in which channels are formed or which are suitable for the formation of channels.

It is the object of the invention to provide open-cell bodies which can be economically favorably manufactured despite the small dimensions.

In accordance with the invention, this object is achieved for a method of manufacturing an open-cell body from a metal or ceramic material, wherein individual parts of an open pore plastic in a size which corresponds to the size of the bodies to be manufactured while taking account of the shrinkage on a sintering or an open pore plastic element (1) having predetermined points (2) which take account of the size and geometrical design of bodies to be manufactured while considering the shrinkage in the sintering are/is infiltrated and coated with a suspension in which, in addition to a liquid, at least one powdery material is contained with which the bodies are manufactured; and organic components are expelled after a first heat treatment, and subsequently a sintering is carried out in which open-cell bodies are obtained, wherein the parts of porous plastic provided with the suspension are separated before the first heat treatment and/or sintering, or the open-cell element obtained from the plastic element (1) from the material with which the bodies are formed are serparated after the sintering by forces acting at the predetermined break points and thereby bodies were obtained present in serparated form. Bodies manufactured using the method are formed from a metal or ceramic material and which are manufactured using a method in accordance with one of the preceding claims, characterized in that the total outer surface has an irregular structure and/or has not been obtained by a mechanical, chipping and/or thermal machining. Advantageous embodiments and further developments of the invention can be realized using features characterized in that predetermined break points (2) predefined at a plastic element (1) are formed by a stripping of the plastic material or by a cutting process, characterized in that a web having a thickness of at least 0.5 mm is maintained at the predefined predetermind break points (2), characterized in that the material stripping for forming predefined predetermined break points (2) at a plastic element (1) is achieved by cutting, thermally by means of irradiation, or by punching, characterized in that the material stripping for forming predefined predetermined break points (2) at a plastic element (1) is carried out at a surface of the plastic element (1), characterized in that a plastic element (1) is used in which predefined predetermined break points (2) are formed which have different geometries, characterized in that a plastic element (1) is used in which predefined predetermined break points (2) are fomed with which an annular body or a frame-shaped body of a polygon is formed after the sintering and the cutting of the predetermined break points, characterized in that the bodies have a dimensioning in which a maximum edge length or a maximim outer diameter is no more than 20 mm, characterized in that the bodies are formed and/or are coated at the surface with at least one catalytically active substance, a catalytically active chemical compound and/or a catalytically active chemical element, characterized in that the bodies are formed from and/or coated with iron, cobalt, nickel or a respective alloy thereof, characterized in that the bodies have a porosity of at least 90% and/or a physical density of a maximum of 1.5 g/cm$^3$, and/or characterized in that the bodies are formed in the form of a circle, of an annulus, of a polygon and/or of a frame-shaped element of a polygon.

The open-cell bodies manufactured in accordance with the invention are formed from a metal or ceramic material. They should have a dimensioning at which there is a maximum edge length or a maximum outer diameter of no more than 20 mm, preferably no more than 15 mm. A cube as an open-cell body can thus have edge lengths which are a maximum of 20 mm or a maximum of 15 mm in length.

With the bodies manufactured in accordance with the invention, the total outer surface has an irregular structure and/or it has not been obtained by a mechanical, chipping and/or thermal machining as is, however, the case in the prior art.

The bodies manufactured in accordance with the invention can preferably be used in bulk. They can be used for synthesis or also for separation, e.g. as particle separators, in this form. On the use for synthesis, the bodies can be formed with at least one catalytically active substance, a catalytically active chemical compound and/or a catalytically active chemical element and/or can be coated therewith at the surface. With a coating, the inner region of the webs of an open-cell porous structure should also be coated as completely as possible.

The bodies for a Fischer-Tropsch synthesis can be formed from and/or be coated with iron and/or cobalt or an alloy thereof.

For other catalytic processes, the bodies can also be formed from and/or coated with nickel, iron, cobalt or an alloy thereof.

The bodies should advantageously have a porosity of at least 90% and/or a physical density of a maximum of 1.5 g/cm$^3$.

A procedure is followed in the manufacture of the bodies such that individual parts of an open-porous plastic are used in a size which corresponds to the size of the bodies to be manufactured, while taking account of the shrinking on a sintering or an open-pore plastic element having predefined predetermined break points which take account of the size and geometrical design of bodies to be manufacturing while considering the shrinkage on a sintering.

The parts of the plastic having open pores or an open-pore plastic element are infiltrated and coated with a suspension in which in addition to a liquid, an organic binder, at least a powdery material are contained with which the bodies are manufactured, Subsequently to this, organic components are expelled by a first heat treatment. It is possible to carry out a drying before this heat treatment in order correspondingly to obtain several green compacts or one green compact from the parts or from the plastic element. Subsequently to the first heat treatment, a sintering is then carried out in which open-cell bodies are obtained, wherein the parts of porous plastic provided with the suspension are separated before the first heat treatment and/or sintering or wherein, after the sintering, the open-cell element which is obtained from the plastic element made from a material with which the bodies are formed are cut by forces acting at the predetermined break points after the sintering and thereby bodies are obtained which are present in separated form.

Parts of porous plastic can be obtained by a cutting process (e.g. cutting with a blade or with laser radiation) from a porous plastic body and the individual parts are then dipped into the respective suspension to achieve the coating and infiltration. It is advantageous in this respect to press the parts together so that their volume is reduced and the pores open and increase in size in the subsequent re-expansion, whereby the absorption of the suspension into the interior can be improved. This process can be repeated several times.

On the use of a plastic element which is preferably of plate-form, the process of coating can likewise be assisted by a pressing together. Rollers can be used for this purpose between whose gap a plate-shaped plastic element is guided.

At the predefined predetermined break points at a plastic element, a web should be maintained having a thickness of at least 0.5 mm. A sufficient strength in the machining, in particular in the coating/infiltration can thereby be achieved with the dispersion.

The predefined predetermined break points should, however, also have a clearance with which it can be ensured that a sintering together in the region of the predetermined break points can be avoided. For this purpose, the gap should have a width of at least 0.5 mm, preferably 1.5 mm, to a depth of at least 25% of the plate thickness of a porous plastic element, starting from a surface of the plastic element. On a formation of predefined predetermined break points of two oppositely dispose surfaces, the depth can respectively amount to half the depth defined in advance.

Plastic elements can be used in the invention for the manufacture of the bodies in which the predefined predetermined break points have already been formed on the manufacture of such plastic elements, for example by using correspondingly contoured shaping tools.

There is, however, also the possibility of forming the contouring for the predefined predetermined break points subsequently in a plate-like plastic element in that foam material is removed or stripped. This can be done by cutting, thermally by means of irradiation or by punching. Cutting, sawing, milling, laser machining, the use of hot wires (electrically resistance-heated wires) or hot embossing tools can be used. A grid-shaped, sufficiently heated embossing tool can thus, for example, be directed to the surface of a plastic element and plastic material can thus be removed in the regions in which predefined predetermined break points are to be formed.

Plastic elements of foams of different plastics can be used, but preferably of polyurethane. The plastic foam should in this respect, however, have a sufficient porosity and a mean pore size which also allow a coating/wetting with the dispersion in the interior of the plastic element formed from the foam.

A sintered semi-finished product in which predetermined break points are formed after the sintering can be converted into individual mutually completely separate bodies by the effect of external forces for the separation. With very good and very small predetermined break points, the force of gravity can already be sufficient to effect a breaking apart. In this respect, the sintered semi-finished product can be pushed over an edge and the region then floating freely can be simply broken off. However, one or more plungers can also be used which act on a surface and which effect a break at the predetermined break points. The use of one or more rollers is also possible which a corresponding semi-finished product can be moved past or which can move between a plurality of rollers. For this purpose, a plurality of rollers can be rotated about axes which are not aligned in parallel with one another. Predetermined break points which are aligned perpendicular to the direction of movement of the semi-finished product and also predetermined break points which are aligned at an angle of up to a maximum of 90° thereto can thereby be simultaneously broken off and the bodies can thereby be separated. A plurality of rollers can form an "arc" for this purpose.

If bodies in accordance with the invention are used while using parts of plastic foam of correspondingly small sizes which are individually coated with the dispersion, the coated parts should be arranged for the first heat treatment, but at least during the sintering, such that a sintering together of bodies can be avoided. If, however, a sintering together of a plurality of bodies should not be able to be avoided, they should be separated from one another.

Bodies can be manufactured in different geometries. They can, for example, be manufactured as cylindrical, triangular or as a cube or parallelepiped, On the manufacture using a plastic element having predefined predetermined break points, bodies can be obtained as cubes or parallelepipeds which are at least approximately of the same design and dimensions. This is desirable if such at least approximately like bodies are desired for a specific application.

Bodies can also be manufactured as rings, annular rings, squares or polygons. If, for example, two annular shaped contours are formed for predefined predetermined break points having different diameters and in this respect an annulus is arranged in the interior of the other annulus having the larger diameter, circular and annular shaped bodies can be obtained after the sintering. This also applies to the different polygonal geometries in which polygonal bodies and corresponding thereto bodies designed polygonally geometrically and which can each represent a frame about a polygonal body can be manufactured. Such differently designed bodies can be obtained after the sintering and after the cutting through of the predetermined break points.

Channels or bodies forming channels can then be provided using such frames or annulus rings. Bodes of annular shape or of frame shape can thus form a channel in a serial arrangement, for example. In this form, they can be arranged in the interior of a pipe or of a correspondingly shaped housing.

Bodies of annular shape or of frame shape can thus also be arranged outwardly about a pipe or a housing and surround it. There is naturally also the possibility of a combination of these arrangements with a pipe or housing at the inside or at the outside.

There is also the possibility of using a plastic element which has a surface contour at its surface or where it has been formed by a material stripping at the plastic element. A surface contour can in this respect have a geometrical design differing from a smooth planar surface, for example having elevated portions or recesses, which are also arched or rounded. Steps which can have different heights or thicknesses can also be formed at a plastic element. Open-cell, sintered bodies can thereby be manufactured which have a corresponding surface contour which is only influenced by the shrinkage on sintering. There is thus the possibility of manufacturing open-cell bodies with predetermined break points and/or surface contours.

The invention will be explained in more detail by way of example in the following.

There is shown:

FIG. 1 a perspective representation of a plastic element from a plastic foam having predefined predetermined break points.

A porous plastic element 1 is shown in FIG. 1 in which predetermined break points 2 which are predefined in a surface by a material stripping or in the manufacture of the plastic element 1 have been formed in the form of respective lines aligned perpendicular to one another. The predefined predetermined break points 2 can also have different geometrical designs at the plastic element 1.

EXAMPLE 1

A polyurethane sponge as a porous plastic having a dimension of 200 mm×200 mm, a thickness of 10 mm and a cell size of 1300 μm was cut using a cutting blade into 400 cubes having an edge length of 10 mm×10 mm×10 mm. These 400 cubes were wetted with a metal powder/binder suspension comprising 80 wt. % AISI430 metal powder having a particle size d90<22 μm and 20 wt. % of an 8% aqueous PVA solution and were subsequently led through 2 rollers having a roller spacing of 2 mm several times after one another. A homogeneous coating of the surface of the plastic was thereby achieved in and at the porous plastic element which resulted in a mean weight of the individual cubes of 0.4 g respectively. After a drying, the so-called green cubes were debound in a batch furnace in a hydrogen atmosphere, that is the organic components were removed. Subsequently to this, the cubes were sintered at a temperature of 1260°. The sintered cubes were subsequently separated and deburred in a rotating container. The cubes had a mean density of 0.5 g/cm$^3$ after the sintering.

EXAMPLE 2

A polyurethane sponge having a dimension of 200 mm×200 mm, a thickness of 10 mm and a cell size of 1900 μm was cut using a cutting blade into 400 cubes having an edge length of 10 mm×10 mm×10 mm. These 400 cubes were wetted with a ceramic powder/binder suspension comprising 60 wt. % $Al_2O_3$ powder having a particle size d90<1 μm and 40 wt. % of an 10% aqueous PVA solution and were subsequently led through two rollers having a roller spacing of 1 mm several times after one another. A homogeneous coating was thereby achieved which resulted in a mean cube weight of 0.3 g. After a drying, the so-called green cubes were debound in a furnace and sintered as bulk cubes at air at a temperature of 1450°C. The cubes had a mean density of 0.4 g/cm$^3$ after the sintering.

EXAMPLE 3

In a polyurethane foam as a porous plastic element 1 having a cell size of 900 μm and a thickness of 8 mm gaps were cut out as predefined predetermined break points 2 using a hot wire (electrical resistance heating wire). The gap width amounted to 0.85 mm in this respect. The thickness of the predefined predetermined break point 2 amounted to 1 mm, The dimensions of the remaining structure after the incorporation of the predetermined break points 2 and gaps were selected such that bodies having the dimensions 8 mm×8 mm×6 mm were obtained after the sintering, The polyurethane sponges thus processed were wettted with a metal powder/binder suspension comprising 95 wt. % AISI316 metal powder having a particle size $d_{90}$<22 μm and a 6% aqueous PVA solution and were subsequently led through two rollers having a roller spacing of 1 mm several times after one another. A homogeneous coating was thereby achieved which resulted in a mean density of 0.3 g/cm$^3$. After a drying, the so-railed cuboid green bodies were debound in a furnace and were sintered in the batch furnace in a hydrogen atmosphere at a temperature of 1260° C., After the sintering, the bodies having the dimensions 8 mm×8 mm×6 mm were broken out of the plate at the predefined predetermined break points. The cuboid bodies had a mean density of 0.5 g/cm$^3$ after the sintering.

EXAMPLE 4

In a polyurethane foam as a plastic element 1 having a cell size of 1200 μm and a thickness of 10 mm gaps were cut out as predefined predetermined break points 2 using a hot wire. The gap width amounted to 0.85 mm in this respect. The thickness of the predefined predetermined break point 2 amounted to 1.5 mm. The dimensions of the remaining structure after the incorporation of the predetermined break points 2 and gaps were selected such that bodies having the dimensions 10 mm×10 mm×6 mm were obtained after the sintering.

The polyurethane sponge thus processed was wettted with a metal powder/binder suspension comprising 85 wt. % Fe23Cr6Al metal powder having a particle size $d_{90}$<22 µm and a 6% aqueous PVA solution and was subsequently led through two rollers having a roller spacing of 1 mm several times after one another. A homogeneous coating was thereby achieved which resulted in a mean density of 0.4 $g/cm^3$. After a drying, the so-called green cubes were debound in a furnace and sintered in a batch furnace and in a hydrogen atmosphere at a temperature of 1260° C. After the sintering, the bodies having the dimensions 10 mm×10 mm×6 mm were broken out of the plate at the predefined predetermined break points. The cubes had a mean density of 0.5 $g/m^3$ after the sintering.

EXAMPLE 5

A polyurethane sponge having a dimension of 200 mm×200 mm, a thickness of 10 mm and a cell size of 1000 µm of the open pores was cut using a cutting blade into 400 cubes having an edge length of 10 mm×10 mm×10 mm. These 400 cubes were wetted with a metal powder/binder suspension comprising 80 wt. % Co metal powder having a particle size d90<10 µm and 20 wt. % of an 8% aqueous PVA solution and were subsequently led through 2 rollers having a roller spacing of 1 mm several times after one another. A homogeneous coating of the surface of the plastic was thereby achieved in and at the porous plastic element which resulted in a mean weight of the individual cubes of 0.5 g respectively. After a drying, the so-called green cubes were debound in a batch furnace in a hydrogen atmosphere, that is the organic components were removed. Subsequently to this, the cubes were sintered at a temperature of 1350°. The sintered cubes were subsequently separated in a rotating container. The cubes had a mean density of 0.7 $g/cm^3$ after the sintering.

The invention claimed is:

1. A method of manufacturing multiple same-size open-cell bodies comprising the steps of
    infiltrating and coating a open pore plastic element with a suspension containing a liquid and at least one powdery material with which the bodies are to be manufactured, the open pore plastic element having predetermined break points defining the same size and geometrical design as the open-cell bodies to be manufactured while taking account of shrinkage during sintering,
    expelling organic components after a first heat treatment, subsequently
    sintering the infiltrated and coated plastic element, and
    separating the sintered, infiltrated and coated plastic element into the multiple same-size open-cell bodies by forces acting at the predetermined break points.

2. A method in accordance with claim 1, characterized in that the predetermined break points are formed by stripping an open-pore plastic material or by cutting an open-pore plastic material.

3. A method in accordance with claim 1, characterized in that a web having a thickness of at least 0.5 mm is maintained at the predefined predetermined break points.

4. A method in accordance with claim 1, characterized in that forming the predetermined break points is achieved by cutting, thermally by means of irradiation or by punching.

5. A method in accordance with claim 1, characterized in that the predetermined break points are formed by stripping an open-pore plastic material carried out at a surface of the plastic material.

6. A method in accordance with claim 1, characterized in that a plastic element is used in which predefined predetermined break points are formed with which an annular body or a frame-shaped body of a polygon is formed after the sintering and the cutting of the predetermined break points.

* * * * *